United States Patent [19]

Yoshizumi et al.

[11] Patent Number: 4,766,303
[45] Date of Patent: Aug. 23, 1988

[54] OPTICAL INFORMATION SYSTEM HAVING A BIREFRINGENCE PLATE MOVABLY DISPOSED IN ACCORDANCE WITH THE DETECTED LIGHT INTENSITY

[75] Inventors: Keiichi Yoshizumi; Akira Matsubara; Takao Hayashi, all of Osaka, Japan

[73] Assignee: Matsushita Electric Industrial Co., Ltd., Osaka, Japan

[21] Appl. No.: 49,262

[22] Filed: May 13, 1987

[30] Foreign Application Priority Data

May 20, 1986 [JP] Japan ................. 61-115292

[51] Int. Cl.[4] .................................... G01J 1/32
[52] U.S. Cl. ......................... 250/205; 350/401
[58] Field of Search ............ 250/205, 201 DF; 369/44, 46; 350/401

[56] References Cited

U.S. PATENT DOCUMENTS

| | | | |
|---|---|---|---|
| 4,118,736 | 10/1978 | Okada et al. | 250/201 DF |
| 4,374,324 | 2/1983 | Van Rosmalen et al. | 369/44 |
| 4,381,557 | 4/1983 | Jebens | 369/46 |
| 4,555,620 | 11/1985 | Bridson et al. | 250/205 |
| 4,613,961 | 9/1986 | Aarts | 369/44 |
| 4,623,994 | 11/1986 | Nabeshima et al. | 369/44 |

FOREIGN PATENT DOCUMENTS 0109194  5/1984  European Pat. Off.

Primary Examiner—David C. Nelms
Assistant Examiner—William L. Oen
Attorney, Agent, or Firm—Lowe, Price, LeBlanc, Becker & Shur

[57] ABSTRACT

An optical information system includes an optical source emitting light. An information recording member is exposed to the emitted light. A beam splitter disposed between the light emitting source and the information recording member separates light reflected by the information recording member and light traveling from the light emitting source to the information recording member. A device detects intensity of the separated reflected light. A birefringence plate is movably disposed between the light emitting source and the information recording member. The birefringence plate is moved in accordance with the detected intensity of the separated reflected light.

16 Claims, 5 Drawing Sheets

OPTICAL INFORMATION SYSTEM HAVING A BIREFRINGENCE PLATE MOVABLY DISPOSED IN ACCORDANCE WITH THE DETECTED LIGHT INTENSITY

BACKGROUND OF THE INVENTION

1. Field of the Invention

This invention relates to a system for optically reproducing information stored in an optical recording medium such as an optical memory disc or card. This invention also relates to a system for optically recording information on an optical memory member.

2. Description of the Prior Art

Some optical information recording mediums deform or color in response to light. In writing information on such an optical memory, light from a source such as a laser is digitally modulated in accordance with an information signal, and this modulated light is applied to the memory with scanning process perfomed. In reproducing the information from the optical memory, light is applied to the memory with scanning process perfomed. Light reflected by the memory contains the information, which is derived via an optical detector.

Such information reproducing process includes the step of separating the incident light to the memory and the reflected light from the memory. A combination of a polarization beam splitter and a quarter-wave plate is conventionally used to separate the incident light and the reflected light.

Generally, characteristics of birefringence of an optical memory adversely affects the reproduction of information from the memory. In cases where characteristics of birefringence vary from memory to memory, accuracies of reproduced information derived through conventional systems tend to sometimes fall considerably.

SUMMARY OF THE INVENTION

It is a first object of this invention to provide an accurate optical information system.

It is a second object of this invention to provide an optical information system which can compensate characteristics of birefringence of an optical memory.

It is a third object of this invention to provide an optical information system which can maintain adequate accuracy of reproduced information even in cases where characteristics of birefringence vary from memory to memory.

In accordance with a first aspect of this invention, an optical information system includes an optical source emitting light. An information recording member is exposed to the emitted light. A beam splitter disposed between the light emitting source and the information recording member separates light reflected by the information recording member and light traveling from the light emitting source to the information recording member. A device detects intensity of the separated reflected light. A birefringence plate is movably disposed between the light emitting source and the information recording member. The birefringence plate is moved in accordance with the detected intensity of the separated reflected light.

In accordance with a second aspect of this invention, an optical information system includes an optical source emitting light. An information recording member is exposed to the emitted light. A beam splitter disposed between the light emitting source and the information recording member separates light reflected by the information recording member and light traveling from the light emitting source to the information recording member. A device detects intensity of the separated reflected light. A birefringence plate is movably disposed between the light emitting source and the information recording member. The birefringence plate is moved to a position at which the detected intensity of the separated reflected light is maximized.

BRIEF DESCRIPTION OF THE DRAWINGS

Like and corresponding elements are denoted by the same reference characters throughout the drawings.

DESCRIPTION OF THE PREFERRED EMBODIMENTS

Before embodiments of this invention will be described, a conventional optical information reproducing system will be described in the following for a better understanding of this invention.

Figure 1:
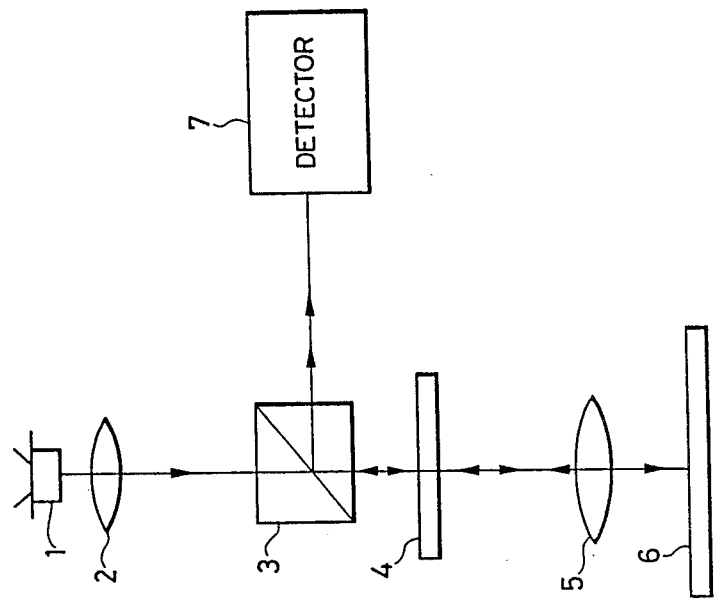
FIG. 1 is a diagram of a conventional optical information reproducing system.

FIG. 1 shows a conventional optical information reproducing system. In the conventional system of FIG. 1, a semiconductor laser 1 emits P-polarized light. A collimating lens 2 forms the laser light into parallel rays. The parallel rays enter a polarization beam splitter 3. The polarization beam splitter 3 fully passes P-polarized light and fully reflects S-polarized light. Since the light moved from the collimating lens is P-polarized, essentially all of this light passes through the polarization beam splitter 3. After passing through the polarization beam splitter 3, the P-polarized light is subjected to birefringence by a quarter-wave plate 4 and is thus converted into clockwise circularly polarized light. The clockwise circularly poolarized light travels from the quarter-wave plate 4 to a condenser lens 5. The condenser lens 5 concentrates the clockwise circularly polarlized light on an information recording member 6. The clockwise circularly polarlized light is reflected by the recording member 6 and is converted into counter-clockwise circularly polarized light through reflection. Scanning process allows the reflected light to be modulated in accordance with information stored in the recording member 6. The counterclockwise circularly polarized light passes through the condenser lens 5 and enters the quarter-wave plate 4. The counterclockwise circularly polarized light is subjected to birefringence by the quarter-wave plate 4 and is thus converted into S-polarized light. The S-polarized light travels to the polarization beam splitter 3. Essentially all of the S-polarized light is reflected by the polarization beam splitter 3 and is transmitted into an optical detector 7. The previously-mentioned operation of the conventional system of FIG. 1 is generally satisfied in the case of a recording member having negligible birefringence.

In the case of a recording member 6 having great birefringence, the clockwise circularly polarized light is converted by the recording member 6 into elliptically polarlized light through reflection. Accordingly, after passing through the quarter-wave plate 4, the reflected light has an appreciable P-polarlized component. As the P-polarized component increases, the S-polarized component decreases. The polarization beam splitter 3 reflects S-polarized light but passes P-polarized light. Thus, the optical detector 7 receives a reduced intensity or quantity of the signal light. The P-polarized component of the reflected light passes through the polarization beam splitter 3 and finally returns to the laser 1. The return of the light to the laser 1 causes noise in the light emitted from the laser 1.

To prevent such disadvantages caused by the birefringence of a recording member 6, it is a common prectice to fixedly dispose the quarter-wave plate 4 at a predetermined angular position and at a predetermined inclination where the light reflected by the recording member 6 is converted into counterclockwise circularly polarized light.

The predetermined angular position and the predetermined inclination of the quarter-wave plate 4 depend on the degree of birefringence of the recording member 6. Accordingly, in cases where characteristics of birefringence vary from recording member to recording member, that is, in cases where recording members have different birefringence characteristics respectively, the conventional system of FIG. 1 tends to sometimes cause inaccurate reproduction of information.

Figure 2:
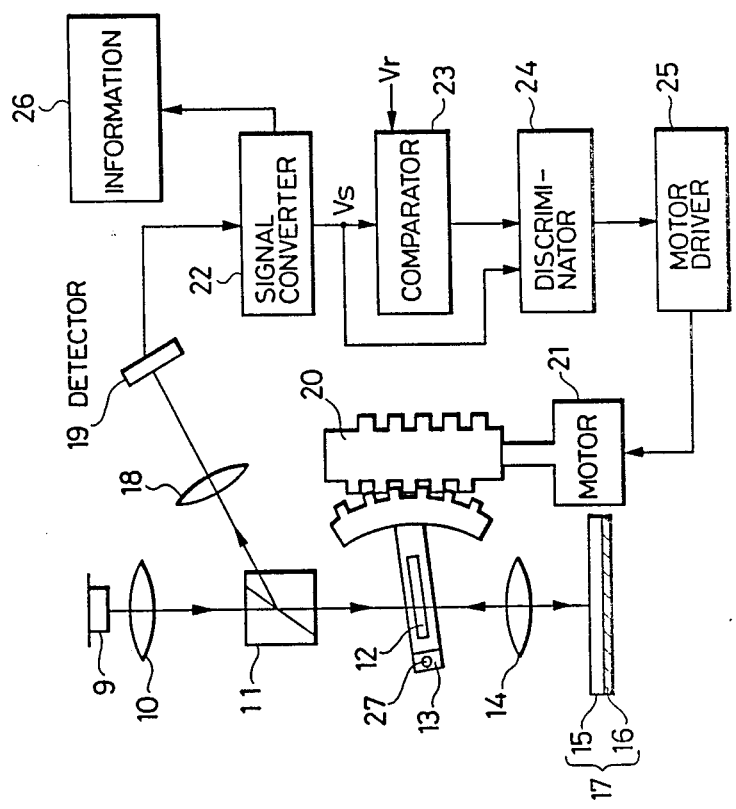
FIG. 2 is a diagram of an optical information system according to a first embodiment of this invention.

FIG. 2 shows an optical information system according to a first embodiment of this invention. In the system of FIG. 2, a semiconductor laser 9 emits P-polarized light. A collimating lens 10 forms the laser light into parallel rays. The parallel rays travel from the collimating lens 10 to a polarization beam splitter 11. The polarization beam splitter 11 fuly passes P-polarized light but fully reflects S-polarized light. The semiconductor laser 9 is positioned relative to the polarization beam splitter 11 so that the light emitted from the semiconductor laser 9 constitutes P-polarized light with respect to the polarization beam splitter 11. Accordingly, essentially all of the light from the collimating lens 10 passes through the polarization beam splitter 11.

Figure 4:
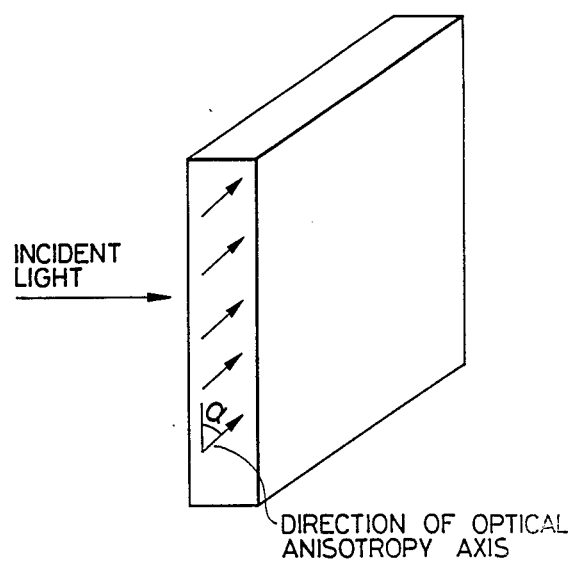
FIG. 4 is a perspective view of an example of the birefringence plate of FIG. 2.

After passing through the polarization beam splitter 11, the P-polarized light enters a birefringence plate 12. The birefringence plate 12 includes a preset wave plate having optical anisotropy. As shown in FIG. 4, the optical anisotropy axis of the wave plate 12 may be oblique with respect to the greatest surfaces of the plate 12, since the degree of effective birefringence can be varied with inclination of the plate 12. In the case of a birefringence plate of FIG. 4, the incident light is exposed to birefringence only by a component $D\cos\alpha$ perpendicular to the optical axis of the incident light, where the character D represents the level or quantity of birefringence along the optical anisotropy axis of the plate 12 and the character $\alpha$ represents the angle between the optical anisotropy axis of the plate 12 and a plane perpendicular to the optical axis of the incident light (see FIG. 4). As the birefringence plate 12 is inclined through an angle $\theta$, the level or quantity of effective birefringence is made equal to $D\cos(\alpha+\theta)$ and the change in effective birefringence quantity equals $D[\cos\alpha - \cos(\alpha+\theta)]$.

Figure 5:
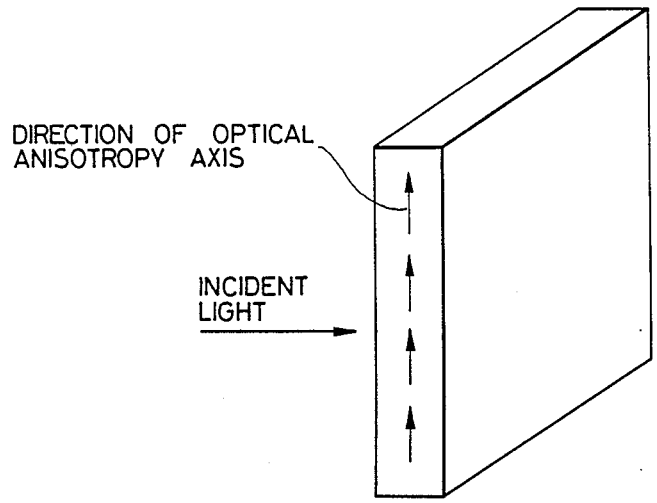
FIG. 5 is a perspective view of another example of the birefringence plate of FIG. 2.

As shown in FIG. 5, the optical anisotropy axis of the wave plate 12 may be parallel to the greatest surfaces of the plate 12. In the case of a birefringence plate 12 of FIG. 5, as the plate 12 is inclined through an angle $\theta$, the level or quantity of effective birefringence is made equal to $D\cos\theta$ and the change in effective birefringence quantity equals $D(1-\cos\theta)$. When the angle $\theta$ is equal to or smaller than 10°, the effective birefringence change is maximized at an angle $\alpha$ equal to 90°. At an angle $\alpha$ equal to 90°, the level or quantity of effective birefringence is null for incident light perpendicularly entering the plate 12.

The angle $\alpha$ of the birefringence plate 12 is preferably slightly different from 90° so that the level or quantity of effective birefringence for incident light perpendicularly entering the plate 12 corresponds to a quater wavelength. In this case, the birefringence plate 12 serves as a pure quarter-wave plate when a recording member has no birefringence. Such a wave plate is generally called a modified Berek type. The birefringence plate 12 is positioned so that the direction of polarization of incident laser light is inclined at an angle of 45° with respect to a direction perpendicular to the incident light.

Figure 3:
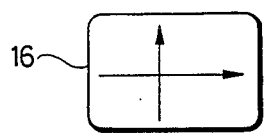
FIG. 3 is a plan view of the recording layer of the recording member of FIG. 2

The laser light is subjected to birefringence by the wave plate 12 and is thus converted into elliptically polarized light. The elliptically polarized light is concentrated by a condenser lens 14 on an optical recording member 17, such as an optical memory card or an optical memory disc. The memory card 17 has an upper protective layer 15 and a lower recording layer 16 (also see FIG. 3). When the concentrated light enters the memory card 17, the light is subjected to birefringence by the protective layer 15. After passing through the protective layer 15, the laser light reaches th recording layer 16.

During information writing process, the laser light is digitally modulated in accordance with information data and a scanning arrangement (not shown) allows the modulated light to form pits in the recording layer 16 in accordance with the information data. During information reading process, the light applied to the memory card 17 is dispersed or absorbed by information recording pits in the recording layer 16 and the light reflected by the memory card 17 is allowed by a scanning arrangement to be modulated in accordance with information data stored in the memory card 17.

The laser light reflected by the recording layer 16 passes through the protective layer 15, the condenser lens 14, and the birefringence plate 12. After passing through the birefringence plate 12, the reflected laser light travels to the polarization beam splitter 11. The polarization beam splitter 11 reflects only an S-polarized component of the laser light reflected by the memory card 17 and directs the S-polarized light toward a conenser lens 18. The condenser lens 18 concentrates the light on an optical detector 19 composed of an optical-to-electrical converter or transducer. The optical detector 19 converts the received light into a corresponding electric current signal containing the information data. In general, the intensity of the light varies with the information data and thus the amplitude of the electric current signal depends on the information data. A signal converter 22 connected to the optical detector 19 changes the electric current signal to a corresponding electric voltage signal and derives information data 26 from the electric current signal. The information data 26 is handled in the form of an electric voltage signal.

The ratio between S-polarized component and P-polarized component of the light reflected by the memory card 17 depends on the birefringence of the protective layer 15. The polarization beam splitter 11 reflects only S-polarized light. Accordingly, the intensity or quantity of the light reflected by the polarization beam splitter 11 and entering the optical detector 19 also denends on the birefringence of the protective layer 15. The inclination of the birefringence plate 12 affects the polarization of the light traveling from the plate 12 to the polarization beam spitter 11. As described hereinafter, the inclination of the birefringence plate 12 is adjusted so that an adequate intensity or quantity of the light can reach the optical detector 19.

Figure 6:
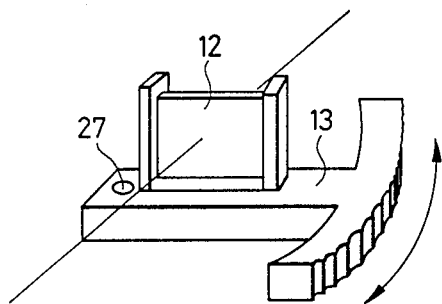
FIG. 6 is a perspective view of the birefringence plate and the associated holder of FIG. 2.

As shown in FIGS. 2 and 6, the birefringence plate 12 is supported by a holder 13 rotatable about a pin 27. As the holder 13 rotates, the birefringence plate 12 is inclined with respect to the axis of the light along the direction of anisotropy of the birefringence. The holder 13 has teeth meshing with teeth of a worm gear 20. The holder 13 rotates with rotation of the worm gear 20. A motor 21 connected to the worm gear 20 serves to drive the worm gear 20. The motor 21 is preferably of the stepping type. In this way, the inclination of the birefringence plate 12 is adjusted via the motor 21.

The signal converter 22 generates a signal voltage Vs dependent on or proportional to the intensity or quantity of the light entering the detector 19. A comparator 23 connected to the signal converter 22 receives the signal voltage Vs. The device 23 compares the signal voltage Vs with a preset reference voltage Vr and generates a binary comparison signal representing whether or not the signal voltage Vs exceeds the reference voltage Vr. A polarity discriminator 24 connected to the signal converter 22 and the comparator 23 receives the signal voltage Vs and the comparison signal. The polarity discriminator 24 is also connected to a motor driver 25. The motor driver 25 is connected to the motor 21.

When the signal voltage Vs does not exceed the reference voltage Vr, the combination of the comparator 23, the polarity discriminator 24, and the motor driver 25 outputs a single drive pulse to the motor 21, thereby rotating the motor 21 through a preset angle and inclining the birefringence plate 12 through a preset angle along the direction of anisotropy of the birefringence. The polarity discriminator 24 holds the signal voltage occuring at a moment prior to the application of the drive pulse to the motor 21. In the polarity discriminator 24, the signal voltage occuring at a moment prior to the application of the drive pulse to the motor 21, that is, the preceding signal voltage, is compared with the signal voltage occuring at a moment following the application of the drive pulse, that is, the current signal voltage. The polarity discriminator 24 controls a motor drive pulse in accordance with the comparison between the preceding signal voltage and the current signal voltage so that the direction of rotation of the motor 21 and thus the direction of rotation of the birefringence plate 12 depend on the comparison between the preceding signal voltage and the current signal voltage. Specifically, in the case where the current signal voltage is higher than the preceding signal voltage, the direction of rotation of the motor 21 and thus the direction of rotation of the birefringence plate 12 are unchanged. In the case where the current signal voltage is equal to or lower than the preceding signal voltage, the direction of rotation of the motor 21 and thus the direction of rotation of the birefringence plate 12 are reversed. As the birefringence plate 12 is inclined, the degree of birefringence of the plate 12 acting on the light varies and thus the polarization of the light also changes. The intensity or quantity of the light entering the optical detector 19 varies with the change in the polarization of the light. The birefringence plate 12 continues to be inclined until the intensity or quantity of the light entering the optical detector 19 increases to a level at which the signal voltage Vs equals the reference voltage Vr.

When the signal voltage Vs exceeds the reference voltage Vr, the combination of the comparator 23, the polarity discriminator 24, and the motor driver 25 stops the motor 21 or holds the motor 21 at rest so that the birefringence plate 12 is stopped or remains at rest.

The reference voltage Vr is chosen to prevent or adequately reduce noise in the laser light and also to allow accurate reproduction of the information from the recoring member 17. Accordingly, even in cases where recording members have different characteristics of birefringence respectively, the laser light noise remains within an acceptable low level range and also the reproduction of information remains accurate.

Figure 7:
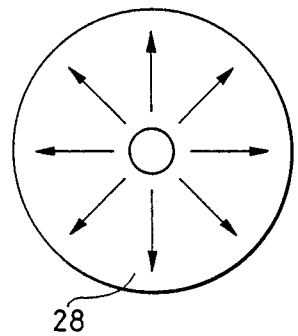
FIG. 7 is a plan view of an optical memory disc.
Figure 8:
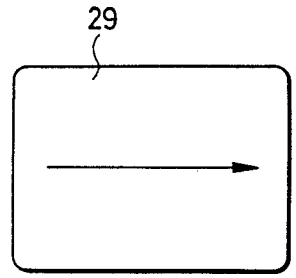
FIG. 8 is a plan view of an optical memory card.

As shown in FIG. 7, in the case where an optical memory disc 28 constituting a recording member 17 is produced through extrusion, anisotropy of birefringence of the disc 28 tends to be directed radially. As shown in FIG. 8, in the case where an optical rectangular memory card 29 constituting a recording member 17 is produced through extrusion, anisotropy of birefringence tends to be directed longitudinally. The directions of anisotropy of birefringence of these memory members 28 and 29 generally depend on the directions of extruding materials.

The direction of the axis of optical anisotropy of the birefringence plate 12 and the direction of anitotropy of the birefringence of the recording member 17 are preferably positioned so that the inclinating movement or rotation of the birefringence plate 12 allows the effective birefringence of the recording member 17 and the effective birefringence of the plate 12 to be mutually offset or compensated. This positioning enables the reflected light to be essentially fully S-polarized before the reflected light travels to the polarization beam splitter 11. It should be noted that the intensity or quantity of the light entering the optical detector 19 is maximized when the reflected light traveling to the polarization beam splitter 11 is fully S-polarized.

In the case of recording members of FIGS. 7 and 8, the inclination of the birefringence plate 12 may be only in a direction parallel to or perpendicular to the direction of optical anisotropy of the recording member.

It is preferable that the process for positioning the birefringence plate 12, that is, the process for determining the inclination of the plate 12, is performed when the laser light is applied to a segment of the recording member 17 which has no pit. In addition, the process for positioning the birefringence plate 20 preferably precedes the normal information recording step or the normal information reproducing step.

Figure 9:
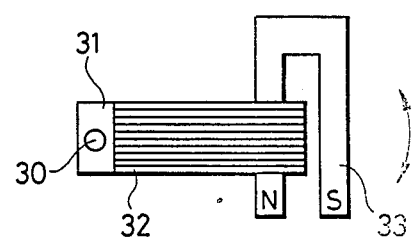
FIG. 9 is a side view of a birefringence plate drive arrangement according to a second embodiment of this invention.
Figure 10:
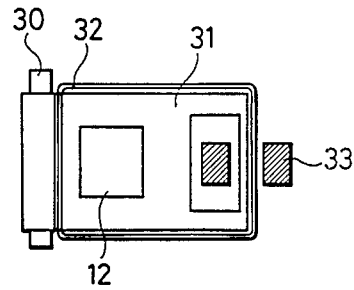
FIG. 10 is a sectional view of the birefringence plate drive arrangement of FIG. 9.

FIGS. 9 and 10 show a second embodiment of this invention, which is similar to the embodiment of FIGS. 1-8 except for the following design changes.

In the embodiment of FIGS. 9 and 10, the worm gear 20 and the motor 21 (see FIG. 2) are omitted. A birefringence plate 12 is mounted on a holder 31 rotatable about a pin 30. A motor includes a fixed magnet 33 and a winding 32 mounted on the holder 31. The motor magnet 33 and the motor winding 32 are magnetically coupled. A force is induced between the motor winding 32 and the fixed magnet 33 when an electric current flows through the motor winding 32. The holder 31 is rotated and thus the birefringence plate 12 is inclined in accordance with an electric current passing through the motor winding 32.

Figure 11:
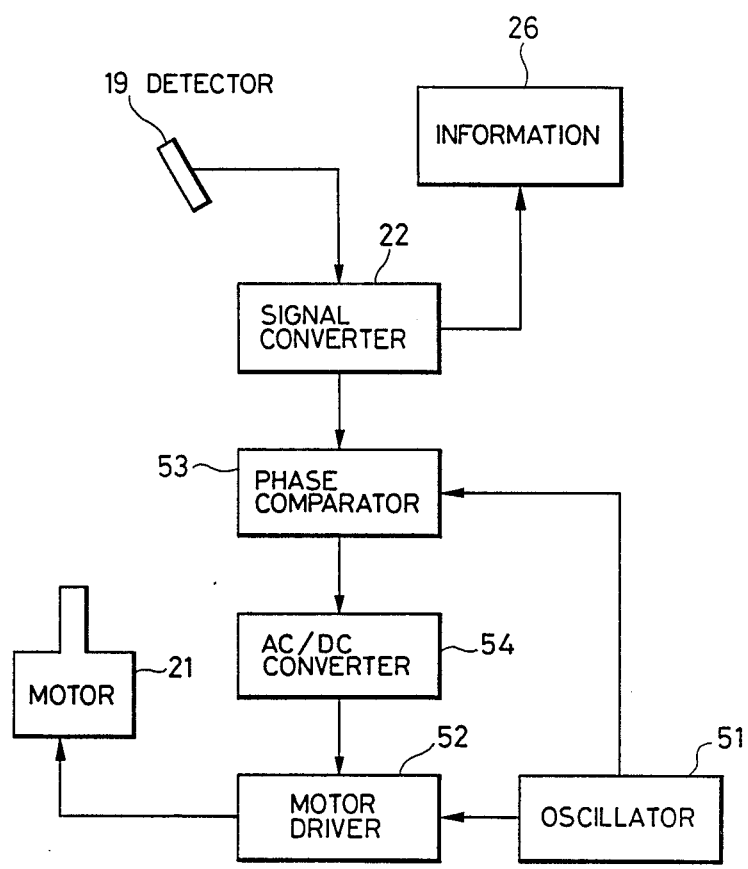
FIG. 11 is a diagram of a portion of an optical information system according to a third embodiment of this invention.

FIG. 11 shows a third embodiment of this invention, which is similar to the embodiment of FIGS. 1-8 except for the following design changes.

In the embodiment of FIG. 11, an oscillator 51 generates a fixed frequency sinusoidal wave signal. A motor driver 52 connected to the oscillator 51 superimposes the sinusoidal wave signal on a basic motor drive signal and derives a final motor drive signal modulated with the sinusoidal wave signal. The motor driver 52 is also connected to the motor 21 to output the final motor drive signal to the motor 21. In this way, a fixed frequency sinusoidal wave signal is superimposed on a current powering the motor 21 so that the angle of the birefringence plate 12 vibrates at the fixed frequency and thus the intensity or quantity of the light entering the optical detector 19 also vibrates at the same frequency. The electric current signal derived by the optical detector 19 and also the signal voltage derived by the signal converter 22 reflect the fixed frequency vibration of the intensity of the light entering the optical detector 19.

A phase comparator 53 connected to the signal converter 22 and the oscillator 51 receives the signal voltage and the sinusoidal wave signal. In this device 53, the phase of the vibrated signal voltage is compared to the phase of the sinusoidal wave signal. The phase comparator 53 generates a binary comparison signal representing whether the phase of the vibrated signal voltage and the phase of the sinusoidal wave signal are equal or opposite. An ac-to-dc converter 54 connected to the phase comparator 53 and the signal converter 22 receives the comparison signal and the signal voltage. The converter 54 derives an ac component from the signal voltage and converts the amplitude of the ac component into a corresponding dc voltage forming the previously-mentioned basic motor drive signal. As the amplitude of the ac component increases, the absolute value of the basic motor drive dc voltage increases. When the amplitude of the ac component is zero, the basic motor drive dc voltage is also zero. The polarity of the basic motor drive dc voltage is controlled in accordance with the comparison signal so that the direction of rotation of the motor 21 depends on the phase comparison by the device 53.

Figure 12:
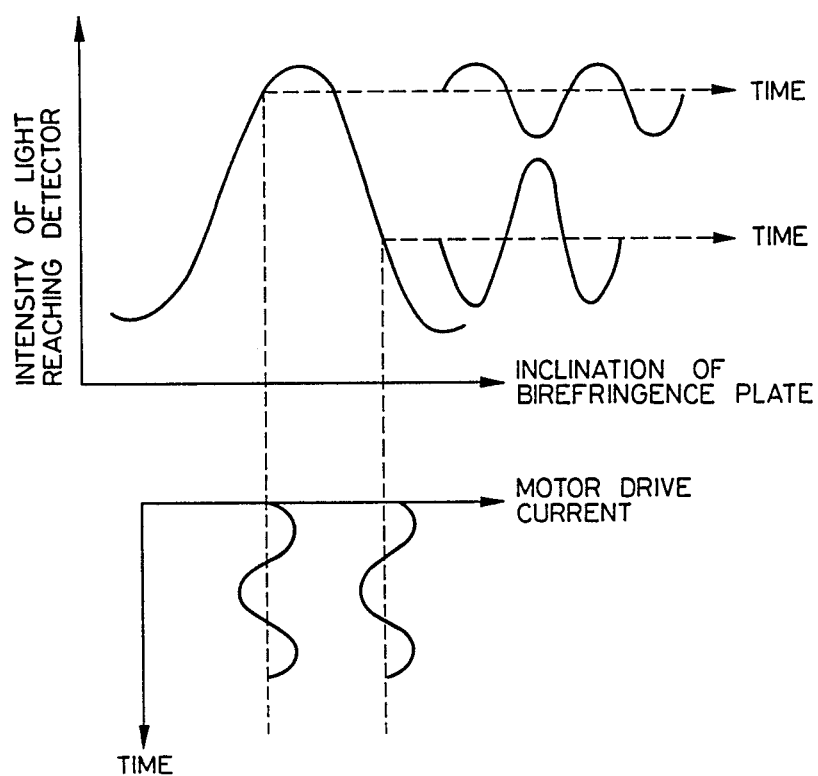
FIG. 12 is a diagram of the relationships among the intensity of the light entering the optical detector, the inclination of the birefringence plate, and the motor drive current in the embodiment of FIG. 11.

The devices 51-54 form a portion of a servo control circuit for adjusting the inclination of the birefringence plate. This servo control circuit is designed so as to allow the basic motor drive dc voltage to be zero. As understood from FIG. 12, the motor 21 is stopped and thus the birefringence plate 12 is stopped when the intensity of the light entering the optical detector 19 is maximized.

What is claimed is:
1. An optical information system comprising:
   (a) means for emitting light;
   (b) an information recording member exposed to the emitted light;
   (c) a beam splitter disposed between the light emitting means and the information recording member for separating light reflected by the information recording member and light traveling from the light emitting means to the information recording member;
   (d) means for detecting intensity of the separated reflected light;
   (e) a birefringence plate movably disposed between the light emitting means and the information recording member; and
   (f) means for moving the birefringence plate in accordance with the detected intensity of the separated reflected light.

2. The system of claim 1 wherein a direction of birefringence of the information recording member is parallel to a direction of birefringence of the birefringence plate.

3. The system of claim 1 wherein a direction of birefringence of the information recording member is perpendicular to a direction of birefringence of the birefringence plate.

4. The system of claim 1 wherein the birefringence plate moving means comprises a holder supporting the birefringence plate, and means for rotating the holder.

5. The system of claim 4 wherein the holder rotating means comprises a gear meshing with teeth formed on the holder, and a motor connected to the gear.

6. The system of claim 4 wherein the holder rotating means comprises a winding mounted on the holder, and a fixed magnet magnetically coupled to the winding.

7. The system of claim 1 wherein the birefringence plate comprises a quarter-wave plate.

8. The system of claim 1 wherein a direction of birefringence of the birefringence plate is inclined with respect to a surface of the birefringence plate.

9. An optical information system comprising:
   (a) means for emitting light;
   (b) an information recording member exposed to the emitted light;
   (c) a beam splitter disposed between the light emitting means and the information recording member for separating light reflected by the information recording member and light traveling from the light emitting means to the information recording member;
   (d) means for detecting intensity of the separated reflected light;
   (e) a birefringence plate movably disposed between the light emitting means and the information recording member; and
   (f) means for moving the birefringence plate to a position at which the detected intensity of the separated reflected light is maximized.

10. The system of claim 9 wherein a direction of birefringence of the information recording member is parallel to a direction of birefringence of the birefringence plate.

11. The system of claim 9 wherein a direction of birefringence of the information recording member is perpendicular to a direction of birefringence of the birefringence plate.

12. The system of claim 9 wherein the birefringence plate moving means comprises a holder supporting the birefringence plate, and means for rotating the holder.

13. The system of claim 12 wherein the holder rotating means comprises a gear meshing with teeth formed on the holder, and a motor connected to the gear.

14. The system of claim 12 wherein the holder rotating means comprises a winding mounted on the holder, and a fixed magnet magnetically coupled to the winding.

15. The system of claim 9 wherein the birefringence plate comprises a quarter-wave plate.

16. The system of claim 9 wherein a direction of birefringence of the birefringence plate is inclined with respect to a surface of the birefringence plate.

* * * * *